United States Patent [19]

Kreibich et al.

[11] 4,259,198

[45] Mar. 31, 1981

[54] USE OF CRYSTALLINE, CROSSLINKED SYNTHETIC RESINS AS A STORAGE MATERIAL IN LATENT HEAT STORES

[75] Inventors: Ursula Kreibich, Riehen; Rolf Schmid, Gelterkinden, both of Switzerland

[73] Assignee: Ciba-Geigy Corporation, Ardsley, N.Y.

[21] Appl. No.: 965,621

[22] Filed: Nov. 28, 1978

Related U.S. Application Data

[63] Continuation of Ser. No. 680,263, Apr. 26, 1976, abandoned.

[30] Foreign Application Priority Data

Apr. 28, 1975 [CH] Switzerland ............... 5446/75

[51] Int. Cl.³ ............... C09K 5/00; C09K 5/02
[52] U.S. Cl. ............... 252/70; 126/400; 126/436; 165/104 S; 525/49; 525/438; 528/60
[58] Field of Search ............... 252/70; 126/400, 436; 165/104 S; 525/438, , 49; 528/60

[56] References Cited

U.S. PATENT DOCUMENTS

| | | | |
|---|---|---|---|
| 3,576,903 | 4/1971 | Groff | 525/438 |
| 3,576,933 | 4/1971 | Bates et al. | 264/523 |
| 3,641,194 | 2/1972 | Schmid et al. | 525/438 |
| 3,655,817 | 4/1972 | Lohse et al. | 525/438 |
| 3,665,939 | 5/1972 | Lang | 132/33 R |
| 3,739,041 | 6/1973 | Schmid et al. | 525/438 |
| 3,979,477 | 9/1976 | Schmid et al. | 525/438 |
| 4,063,546 | 12/1977 | Schmid et al. | 252/70 X |
| 4,176,655 | 12/1979 | Levy | 252/70 X |
| 4,182,398 | 1/1980 | Salyver et al. | 252/70 X |

FOREIGN PATENT DOCUMENTS

| | | |
|---|---|---|
| 896449 | 3/1972 | Canada . |
| 1940269 | 7/1970 | Fed. Rep. of Germany . |
| 1164584 | 9/1969 | United Kingdom . |
| 1275720 | 5/1972 | United Kingdom . |
| 1283653 | 8/1972 | United Kingdom . |
| 1296397 | 11/1972 | United Kingdom . |

OTHER PUBLICATIONS

Kaelble et al., "Crystalline Polymers as Heat Storage Materials in Passive Thermal Protection Systems", Polymer Eng'g and Science, vol. 5, No. 9, Sep. 1977 pp. 673–678.

*Primary Examiner*—Harris A. Pitlick
*Attorney, Agent, or Firm*—Luther A. R. Hall; Joseph F. DiPrima

[57] ABSTRACT

The invention relates to the use of crystalline resins as storage material in latent heat accumulators. Crystalline synthetic resins replace the crystalline inorganic salt of the known latent heat reservoirs. Preferably epoxide resins, polyurethane resins and polyester resins, which contain very specific long-chain polyester molecule moieties, are used. The crystalline synthetic resins have one or more, preferably two, crystallite melt temperatures.

23 Claims, No Drawings

USE OF CRYSTALLINE, CROSSLINKED SYNTHETIC RESINS AS A STORAGE MATERIAL IN LATENT HEAT STORES

This is a continuation of application Ser. No. 680,263, filed on Apr. 26, 1976, now abandoned.

It is known to utilise the phenomenon of absorption and re-release of latent heat during melting or crystallisation of bodies for the storage of heat energy. Installations of this type are classified amongst the so-called "latent heat accumulators". This method has two important advantages over the storage of heat by simple heating of a solid body or of a liquid, without change in the state of aggregation (in so-called "capacity accumulators"). Firstly, it is possible to choose, as the storage material, a body having a relatively low melting point, which largely eliminates heat losses. Secondly, this method gives a substantially greater heat storage capacity, that is to say, per unit weight of the storage material, a much larger amount of heat can be accommodated within the range of temperatures usable in practice.

For latent heat accumulators, in which the heat of fusion is stored, it is primarily salt solutions, salt mixtures and crystalline organic low-molecular substances which are used as the storage medium.

At the present time, the development of latent heat accumulators has not yet progressed very far. This poor state of development is astonishing and also regrettable in as much as at the present time, especially because of energy crises and because of marked trends to pass adverse judgment on the generation of energy by atomic fission, the call for installations for utilisation of solar energy, and similar substitute solutions, is everywhere very pronounced.

If the state of development of latent heat accumulators is analysed in more detail, it is found that, in practice, the greatest technical shortcomings are due to the storage media of the state of the art, especially the salt solutions and salt mixtures. Inter alia, the following disadvantages may be singled out as being serious.

When using salt solutions and salt melts, as well as low-molecular weight organic crystals, there are always severe corrosion problems. For this reason, it is predominantly corrosion-resistant metal containers which are used to contain the salts, but these containers are heavy and conduct heat well. From the point of view of heat storage, both properties are disadvantageous, quite apart from the fact that such containers make the total installations expensive. Furthermore, fractures and leaks of the containers and pipelines must always be expected, and this results in undesirable exudation of the solutions or melts.

The literature states that practically any desired melting point can be obtained by appropriate choice of the salt or by mixing different salts. In reality, however, the situation is not quite so favourable, because if a salt mixture which does not correspond to an eutectic composition is chosen, demixing phenomena always occur when the melt solidifies. Only purely eutectic mixtures crystallise in a constant composition. They are, therefore, for practical purposes the only storage material used at the present time. However, eutectic melts have a great tendency to supercooling and must therefore be seeded. This, in turn, however, has the consequence that here again demixing phenomena gradually manifest themselves. It is not possible to realise, by continuous progression, any desired salt temperature by choosing eutectic salt mixtures, if only because the number of eutectics is limited. Furthermore, some eutectic melt temperatures can only be obtained by choosing unusual expensive salts, which a priori precludes the practical realisation of such eutectics.

It is the object of the invention to provide a storage material, for latent heat stores based on heat of fusion and heat of crystallisation, which does not suffer from the known disadvantages of salts and salt solutions. The melting point or melting range must be controllably adjustable. Any faults due to demixing phenomena or corrosion problems must be excluded. Furthermore, the cost price of such a storage material must lie within reasonable limits.

The invention relates to the use of crystalline, crosslinked synthetic resins as a storage material in latent heat stores. By a crystalline plastic, synthetic resin and epoxide resin there is to be understood, in the present document and in accordance with the present invention, a product which is usually partially crystalline. The synthetic resins used according to the invention have either only one crystallite melting point or several, preferably two, crystallite melting points.

In comparison to salts and organic low-molecular crystals, the synthetic resins used according to the invention exhibit the peculiarity (and the advantage) that when they are used no change in the state of aggregation (that is to say from "solid" to "liquid" and vice versa) occurs. It is true that the crystallites contained in the synthetic resins melt in the region of the crystallite melting point. However, the solid state of the synthetic resins remains preserved. At the same time, in most cases the synthetic resin turns transparent, and there may be a transition to the rubbery-elastic state, with simultaneous absorption of the latent heat of fusion.

According to the invention, it is in particular epoxide resins which are used. A particularly preferred form of the invention is the use of epoxide resins or polyurethane resins or polyester resins or mixtures of these synthetic resins which contain, as crystallite-forming blocks, radicals of long-chain dicarboxylic acids or dialcohols of the formula I

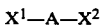

$$X^1-A-X^2 \qquad (I)$$

in which $X^1$ and $X^2$ each represent a —CO.O— group or a —O— group and in which A denotes a substantially linear radical, in which polymethylene chains alternate regularly with ether oxygen atoms or carboxylic acid ester groups, and the quotient Z/Q, wherein Z is the number of $CH_2$ groups present in the recurring structural element of the radical A and Q is the number of oxygen bridges present in the recurring structural element of the radical A, must be at least 3 and preferably at least 5 or 6 and wherein, furthermore, the total number of the carbon atoms present in the radical A in alternating carbon chains is at least 30.

Such special epoxide resins include, in particular, crystalline, crosslinked epoxide resins (J), which are manufactured by reaction of epoxide compounds, containing two or more epoxide groups, (a) with polyester-polycarboxylic acids D, which essentially contain segments of the formula II

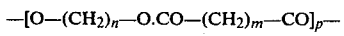

$$-[O-(CH_2)_n-O.CO-(CH_2)_m-CO]_p- \qquad (II)$$

in which n and m are identical or different and denote 2 or a higher number than 2, and to which the condition n+m=6 to 30 applies, and in which p denotes a number from 2 to 40, which, however, is sufficiently large that the segment contains at least 30 —CH$_2$— groups, and (b) if appropriate, with curing agents C, and if appropriate in the presence of accelerators, in a ratio such that 0.5 to 1.2 equivalents of polyester-polycarboxylic acid are present per equivalent of epoxide compound and up to 0.6 equivalent of curing agent C are present per equivalent of epoxide compound, with the proviso that, in the cases in which only difunctional epoxide compounds and difunctional polyester-polycarboxylic acids D are employed, the epoxide groups must be present in excess and the reaction with a curing agent C is essential.

These epoxide resins (J) have only one crystallite melting point.

Such special epoxide resins also include crystalline, crosslinked epoxide resins (K) which are manufactured by reaction of epoxide compounds, containing two or more epoxide groups, (a) with polyester-polycarboxylic acids D which essentially contain segments of the formula II

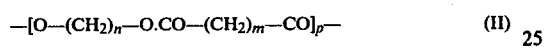

$$-[O-(CH_2)_n-O.CO-(CH_2)_m-CO]_p- \quad (II)$$

in which n and m are identical or different and denote 2 or a higher number than 2, and to which the condition n+m=6 to 30 applies, and in which p denotes a number from 2 to 40, which, however, is sufficiently large that the segment contains at least 30 —CH$_2$— groups, and (b) with polyester-polycarboxylic acids E which essentially contain segments of the formula III

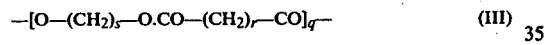

$$-[O-(CH_2)_s-O.CO-(CH_2)_r-CO]_q- \quad (III)$$

in which s and r are identical or different and denote 2 or a higher number than 2, and to which the condition s+r+2≦n+m applies, and in which q represents a number from 2 to 40, which, however, is sufficiently large that the segment contains at least 30 —CH$_2$— groups, and (c) if appropriate, with curing agents C, and, if appropriate, in the presence of accelerators, in a ratio such that 0.5 to 1.2 equivalents of polyester-polycarboxylic acid are present per equivalent of epoxide compound, that 1/10 to 9/10 of these 0.5 to 1.2 equivalents are attributable to the polyester-polycarboxylic acid D and the remaining 9/10 to 1/10 to the polyester-polycarboxylic acid E, and that up to 0.6 equivalent of curing agent C is present per equivalent of epoxide compound, with the proviso that in the cases in which only difunctional epoxide compounds and difunctional polyester-polycarboxylic acids D and E are employed, the epoxide groups must be present in excess and the reaction with a curing agent C is essential.

Preferably, the condition n+m=8 to 24 applies in the formula II for the polyester-polycarboxylic acids.

The epoxide resins (K) are distinguished by a feature which was previously not known for such synthetic resins. This is that they exhibit two pronounced crystallite melting points Tm$_1$ and Tm$_2$. Tm$_1$ is in the range from 20° to 70° C., preferably 25° to 60° C., and Tm$_2$ is in the range from 50° to 120° C., preferably 50° to 100° C. The crystallite-forming elements for Tm$_1$ and Tm$_2$ are the polyester-polycarboxylic acids D and E employed in the manufacturing process. Sometimes, the particular crystallite melting point is split. This means that in such cases the crystallite melting point manifests itself as a two-stage melting point.

Preferably, the procedure followed in the manufacture of the epoxide resins (J) and (K) is such that 0.7 to 1.2, especially 0.9 to 1.1, equivalents of polyester-polycarboxylic acid are present per equivalent of epoxide compound.

The polyester-polycarboxylic acids D and D used in the reaction for the manufacture of the epoxide resins (J) and (K) can for practical purposes be manufactured by the same basic process, by esterification of corresponding aliphatic dialcohols and aliphatic dicarboxylic acids or by esterification between suitable derivatives of these alcohols and dicarboxylic acids, such as, for example, the anhydrides, acid chlorides and the like. The dicarboxylic acids must be present in excess.

Where minor amounts of aliphatic polyalcohols with at least 3 OH groups, especially glycerol, are also used, branched, that is to say at least 3-functional, polyester-polycarboxylic acids D and E are obtained. Branched polyester-polycarboxylic acids D and E which are obtained if small amounts of polycarboxylic acids, or their anhydrides, with at least 3 carboxyl groups (such as, for example, trimellitic acid) are also present during the manufacture of the polyester-polycarboxylic acids, are equally suitable for the manufacture of the epoxide resins (J) and (K).

However, it is also possible to employ branched polyester-polycarboxylic acids D and E, which are obtainable by esterification of the terminal OH groups of long-chain polyester-polyols, especially of polyester-diols, with polycarboxylic acids which contain at least 3 —CO.OH groups, such as, for example, trimellitic acid, or with corresponding anhydrides.

The basic rules for the manufacture of the polyester-polycarboxylic acids D and E used as starting materials for the epoxide resins (J) and (K) in other respects entirely correspond to those which have to be observed for the manufacture of the "long-chain dicarboxylic acids" employed according to British Pat. No. 1,164,584, and which are described in detail in this British patent. Further data on the basic principles of the manufacture of such long-chain, aliphatic polyester-polycarboxylic acids are also to be found in a publication by Hans Batzer et al. in "Die Angewandte Makromolekulare Chemie" 1973, page 349–412.

Examples of suitable polyester-polycarboxylic acids D are those based on the following polyalcohols and polycarboxylic acids:

11 mols of adipic acid—10 mols of hexanediol
11 mols of sebacic acid—10 mols of hexanediol
5 mols of decanedicarboxylic acid—4 mols of dodecanediol
11 mols of dodecanedicarboxylic acid—10 mols of butanediol
16 mols of adipic acid—15 mols of hexanediol
11 mols of dodecanedicarboxylic acid—10 mols of hexanediol
11 mols of dodecanedicarboxylic acid—10 mols of propane-1,3-diol
11 mols of dodecanedicarboxylic acid—10 mols of dodecane-1,12-diol
5 mols of dodecanedicarboxylic acid—4 mols of dodecane-1,12-diol
11 mols of sebacic acid—10 mols of butanediol
11 mols of sebacic acid—10 mols of dodecanediol
5 mols of sebacic acid—4 mols of dodecanediol Examples of suitable polyester-polycarboxylic acids E are those based on the following polyalcohols and polycarboxylic acids:
11 mols of sebacic acid—10 mols of hexanediol
11 mols of adipic acid—10 mols of hexanediol
11 mols of succinic acid—10 mols of butanediol
17 mols of succinic acid—14 mols of butanediol
21 mols of succinic acid—20 mols of butanediol
22 mols of succinic acid—21 mols of butanediol
Glycerol-succinic acid-butanediol (1:24:21)
Trimethylolpropane-succinic acid-butanediol (1:30:27)
Glycerol-succinic acid-butanediol (1:17:14)
Glycerol-succinic acid-butanediol (1:30:27)
31 mols of succinic acid—30 mols of butanediol
16 mols of adipic acid—15 mols of hexanediol
11 mols of sebacic acid—10 mols of butanediol
11 mols of dodecanedicarboxylic acid—10 mols of propanediol
7 mols of dodecanedicarboxylic acid—6 mols of propanediol
7 mols of dodecanedicarboxylic acid—6 mols of butanediol
5 mols of sebacic acid—4 mols of hexanediol.

As epoxide compounds containing two or more epoxide groups it is possible to employ practically all the polyepoxy compounds known to those skilled in the art, from publications and patent specifications. In principle, one or more different epoxide compounds can be reacted. Triglycidyl isocyanurate and triglycidyl compounds which contain one or more hydantoin groups and/or dihydrouracil groups, especially epoxide compounds of the formula IV

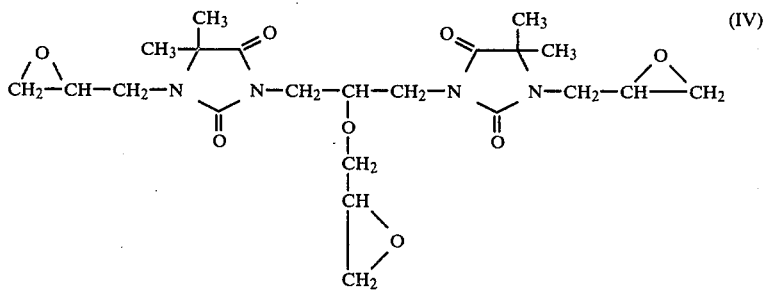

are particularly suitable.

In principle, the reaction for the manufacture of the epoxide resins (J) and (K) can be carried out either in 1 stage or in several stages. If the epoxide compounds used have at least 3 epoxide groups, and polyester-dicarboxylic acids D, or D and E, are employed, it is possible, for example, to carry out the reaction in 1 stage, that is to say to start from a reaction mixture which contains all the reactants simultaneously. It is also possible to proceed in exactly the same way (that is to say in 1 stage) if, instead of the dicarboxylic acids, polyester-polycarboxylic acids D, or D and E, which each have at least 3 carboxyl groups are employed. In the converse case, that is to say when using polyester-polycarboxylic acids containing at least 3 carboxyl groups, and using diepoxy compounds, working in 1 stage is again possible and is the normal method of reaction for such cases.

If only diepoxy compounds and only polyester-dicarboxylic acids are employed, it is possible to work in one stage only if an excess of epoxide compounds is used and at the same time a polycarboxylic acid anhydride is added.

In the multi-stage method, an adduct containing epoxide groups is initially manufactured, in a first stage, from the epoxide compounds and the polyester-polycarboxylic acids, preferably using 0.5 to 1 equivalent of polyester-polycarboxylic acid per 2 equivalents of epoxide compounds. In a second reaction stage, the crosslinking is then carried out, by reaction of the adducts with the remainder of the polyester-polycarboxylic acids. It is also possible to proceed by carrying out the crosslinking in the second stage in the presence of customary curing agents. It is also possible additionally to introduce yet further monomeric epoxide compounds and correspondingly larger amounts of curing agents.

As customary curing agents for epoxide resins it is possible to employ all the substances which are described in the numerous publications and patents relating to epoxide resins. Inter alia, the following substances may be listed here: compounds with amino groups, polyalcohols, polycarboxylic acids and their anhydrides, acid amides, polyesters, phenol-formaldehyde condensates and amino-resin precondensates. Tertiary amines and imidazoles may be mentioned as examples of suitable accelerators.

The reaction in which the epoxide resins (J) and (K) are manufactured is preferably carried out in the melt. For this, preferably temperatures of between 50° and 200° C. and reaction times of more than 1 hour and up to about 20 hours are required. In principle, the reaction according to the invention can also be carried out in solution.

Before or during this reaction, a blowing agent for the manufacture of foams can also be added.

The crystalline, crosslinked plastic products (J) and (K) are as a rule manufactured with simultaneous shaping to give castings, foamed articles, pressings, lacquer films, laminates, adhesive bonds, granules and the like.

Of course, other customary additives, such as fillers, reinforcing agents, mould release agents, agents to protect against aging, flameproofing substances, dyestuffs or pigments, can be added to the moulding compositions.

Suitable fillers or reinforcing agents are fibrous or pulverulent inorganic or organic substances. Quartz powder, aluminium oxide trihydrate, mica, aluminium powder, iron oxide, ground dolomite, chalk powder, gypsum, slate powder, unburnt kaolin (bolus), burnt kaolin, glass fibres, boron fibres and asbestos fibres may be mentioned. A content of materials, in the form of fibres and powders, which assist the heat conductivity has also proved advantageous. Examples of such materials are metals (for example aluminium powder), carbon, such as carbon black and graphite in powder form, and carbon fibres.

For the purpose of optimum and accelerated development of the crystal structure of the polymers it is also advisable to add nucleating agents, such as phthalocyanines, carbon black, α-naphthoic acid or the like.

When using the crystalline, crosslinked epoxide resins (K) as a storage material in latent heat accumulators it is possible either to utilise the enthalpy of melting of only one of the two crystallites, or of both. Preferably, however, only the enthalpy of melting of the crystallite type which melts at the lower temperatures ($Tm_1$) is utilised. This utilises the following valuable property of the present epoxide resins (K): in fact, these resins exhibit excellent toughness and flexibility which, in contrast to previously known epoxide resins, are also retained above $Tm_1$. This advantageous behaviour can be improved yet further by using, in the process of manufacture, those polyester-polycarboxylic acids E which result in a particularly high $Tm_2$. In this way, controlled variation of toughness and flexibility can be achieved.

According to the invention, it is also possible to use crystalline, crosslinked epoxide resins with more than 2 crystallite melting points as a storage material for latent heat stores. Such products can be manufactured by a process which is analogous to the manufacture of the epoxide resins (K). However, the difference from the latter process is that the reaction takes place in the presence of at least one further aliphatic polyester-polycarboxylic acid, which differs from the polyester-polycarboxylic acids D and E and results in the development of at least one further (third) crystallite melting point.

The abovementioned special epoxide resins, used preferentially in accordance with the invention, furthermore include crystalline, crosslinked, elastomeric epoxide resins (L) which are manufactured by reaction of epoxide compounds, containing two or more epoxide groups, (a) with polyester-polycarboxylic acids A which essentially contain segments of the formula V

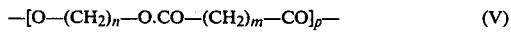
$$-[O-(CH_2)_n-O.CO-(CH_2)_m-CO]_p- \qquad (V)$$

in which n and m are identical or different and denote 2 or a higher number than 2, and to which the condition n+m=6 to 30 applies, and in which p is a number from 2 to 40 which, however, is sufficiently large that the segment contains at least 30 —$CH_2$— groups, and (b) with polyester-polycarboxylic acids B which essentially contain segments of the formula VI

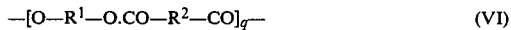
$$-[O-R^1-O.CO-R^2-CO]_q- \qquad (VI)$$

in which $R^1$ and $R^2$ are identical or different and denote an alkylene radical with at least 2 C atoms in the chain and in which, per O bridge, an average of at least 3.5 and at most 30 C atoms, without taking into account the C atoms of the —CO.O— radicals, are present in the chain, and wherein the radicals $R^1$ and $R^2$ together contain at least one alkyl group or cycloalkyl group or one aryl group as a substituent for one H atom or one ring-forming optionally substituted alkylene group as a substituent for two H atoms of a chain, and in which q denotes a number from 2 to 40, which however is sufficiently large that the segment contains at least 30 C atoms, without taking into account the C atoms of the —CO.O— radicals, in the chain, and (c) if appropriate, with curing agents C, and, if appropriate, in the presence of accelerators, in a ratio such that 0.5 to 1.2 equivalents of polyesterpolycarboxylic acid are present per equivalent of epoxide compound, that 5/10 to 9/10 of these 0.5 to 1.2 equivalents are attributable to the polyester-polycarboxylic acid A and the remaining 5/10 to 1/10 to the polyester-polycarboxylic acid B, and that up to 0.6 equivalent of curing agent C is present per equivalent of epoxide compound, with the proviso that, in the cases in which only difunctional epoxide compounds and difunctional polyester-polycarboxylic acids A and B are employed, the epoxide groups must be present in excess and the reaction with a curing agent C is essential.

Preferably, the condition n+m=6 to 24 applies to the formula V.

For the manufacture of these epoxide resins (L), the manufacture of the polyester-polycarboxylic acids used as starting materials, the reaction conditions for the manufacture of the epoxide resins (L) and the possiblities of using a one-step procedure and a multi-step procedure, virtually the same as has been stated above, under the description of the epoxide resins (J) and (K), applies. The same epoxide compounds, curing agents and accelerators can be employed. An admixture of additives customary in such mixtures, especially of fillers, is also possible. Foams can be manufactured by adding blowing agents.

The difference between the manufacture of the epoxide resins (L) and the manufacture of the epoxide resins (K) is that in the two processes different polyester-polycarboxylic acids are employed.

Examples of suitable polyester-polycarboxylic acids A are those based on the following polyalcohols and polycarboxylic acids:

16 mols of adipic acid—15 mols of hexane-1,6-diol
21 mols of succinic acid—20 mols of butane-1,4-diol
11 mols of sebacic acid—10 mols of hexane-1,6-diol
Glycerol—succinic acid—butanediol (1:24:21)
11 mols of succinic acid—10 mols of butanediol
11 mols of dodecanedicarboxylic acid—10 mols of hexanediol
11 mols of dodecanedicarboxylic acid—10 mols of butanediol
11 mols of dodecanedicarboxylic acid—10 mols of propane-1,3-diol
7 mols of dodecanedicarboxylic acid—6 mols of hexanediol
7 mols of dodecanedicarboxylic acid—6 mols of dodecanediol
7 mols of sebacic acid—6 mols of dodecanediol
11 mols of sebacic acid—6 mols of dodecanediol
Trimethylhexanediol—succinic anhydride—butanediol (1:30:27)
11 mols of dodecanedicarboxylic acid—10 mols of ethylene glycol
5 mols of decanedicarboxylic acid—4 mols of dodecanediol
11 mols of decanedicarboxylic acid—10 mols of hexanediol Examples of suitable polyester-polycarboxylic acids B are those based on the following polyalcohols and polycarboxylic acids:
11 mols of sebacic acid—10 mols of neopentylglycol
8 mols of adipic acid—7 mols of neopentylglycol
13 mols of adipic acid—12 mols of neopentylglycol
8 mols of adipic acid—7 mols of trimethylhexanediol 8 mols of trimethyladipic acid—7 mols of neopentylglycol 14 mols of adipic acid—13 mols of neopentylglycol 4 mols of dimerised fatty acid—3 mols of diethylene glycol 4 mols of dimerised fatty acid—3 mols of hexanediol 3 mols of dimerised fatty acid—2 mols of hexanediol Glycerol—adipic acid—butanediol—neopentylglycol (1:9:3:3)

Trimethylhexanediol—adipic acid—hexanediol—neopentylglycol (1:8:2:3)

14 mols of succinic acid—13 mols of neopentylglycol 4 mols of hexahydrophthalic anhydride—3 mols of neopentylglycol The abovementioned special epoxide resins which according to the invention are used preferentially also include those which are manufactured according to the processes claimed in British Pat. Nos. 1,164,584 and 1,283,653.

It should be emphasized once again that a main advantage of the use according to the invention resides in the fact that by selecting the crystalline crosslinked synthetic resins which are used, melting points at which the heat storage is intended to take place can be selected over a wider temperature range. This is because the crystallite melting point of the synthetic resins can be varied in a controlled manner, for example, in the case of the use of epoxide resins, through the choice of the polyester-polycarboxylic acids in respect of the aliphatic acids and alcohols contained therein and their ratios, and through the length of the polyester-polycarboxylic acid segments.

Compared to salts, salt solutions and organic crystals it must also be emphasised, as a technical advance, that the synthetic resins used according to the invention in each case can not only take over the task of heat storage but at the same time also can take over the function of a constructional material. Obviously, in such cases, it is no longer necessary to hold the synthetic resins in a container, let alone in a corrosion-resistant expensive metal container.

The crystalline, crosslinked epoxide resins (K) discussed above, which exhibit two crystallite melting points, are particularly suitable for use as the storage material in latent heat stores whilst simultaneously assuming the additional function of a constructional material. Since these resins retain their good mechanical properties even far above the $Tm_1$, they can, for example, also be employed as self-supporting elements (for example in the form of panels).

A preferred form of the use according to the invention is to use the crystalline, crosslinked synthetic resins in latent heat stores, which are used for the storage and rerelease of solar energy. In installations which separately comprise solar energy collectors, exposed to the sun, in addition to the actual accumulators, and in which the heat is transferred by liquids, through pipes, from one element to the other, the synthetic resins used according to the invention are contained in the accumulators either as self-supporting elements (for example panels) or in containers, in the form of powders or granules.

However, the use according to the invention is also feasible for so-called "heat-rectifiers" which are used for air conditioning of buildings and especially for climatic control of greenhouse. Heat rectifiers of the state of the art are elements of relatively complicated construction which allow the flow of heat to proceed virtually unhampered in one direction, but exhibit strong heat insulation in the opposite direction. In general, such installations advantageously utilise not only the enthalpy of melting of the actual storage material but in addition also the enthalpy of vaporisation of a liquid contained therein. Further details of such complicated heat recifiers are described in the Journal of the World Wild-Life Fund Foundation (Switzerland) "PANDA", No. 1, 8th year of publication, February 1975, on pages 38 to 45.

By means of the use according to the invention, the heat rectifying installations can be simplified to an exceptional degree. The essential element is in general a self-supporting, in most cases dark-coloured, roof panel or wall panel of the synthetic resin used according to the invention. A glass plate is in general located above the surface of the panel which faces the solar radiation, and at a small distance therefrom. The outward release of heat can be retarded by a suitable spacer. During the solar irradiation, the energy is collected as latent heat in the panel. When the external air cools, in the evening and during the night, or on cool days, the storage panel again releases the heat, to the interior of the building. The heat insulation in an outward direction can optionally be increased yet further by temporarily mounting a polystyrene foam sheet over the glass plate. The use of crystalline polymers as a structural foam is particularly advantageous since in that case the storage action is assisted by the insulating action.

When applying the invention in heat rectifiers, the combination with an auxiliary liquid, as described in the abovementioned publication in "PANDA", is in general superfluous. However, this does not mean that this combination should be fundamentally excluded when applying the invention in heat rectifiers. Thus, for example, it is entirely possible technically to improve the system described in detail in PANDA, by means of the use according to the invention, whilst retaining the combination with the auxiliary liquid.

In the application according to the invention in heat rectifiers, the heat-storing panels can consist solely of the storage material containing black dyestuffs and optionally fillers and other additives if, as in the case of the use of the crystalline, crosslinked epoxide resin (K), the panels are inherently sufficiently dimensionally stable (tough and elastic). If this is not the case, it is appropriate to use a fibre laminate (preferably a glass fibre laminate). For example, glass fibre-reinforced Venetian blinds which have mounted on the inside of the window, are of interest. These not only act as a protection against the sun but at the same time as room heaters, and even after the solar irradiation has ceased and after rolling up the blind, a certain heat output still continues. In some cases the use of synthetic resin foams can also be of advantage, according to the invention.

The invention is not restricted to the use of the crystalline, crosslinked synthetic resins in installations for storing solar energy. According to the invention, the synthetic resins can also be employed in latent heat accumulators which serve for the storage and re-release of types of energy other than solar energy. In this context, waste steam energy and off-gas energy from industrial installations, power stations and drive units should be mentioned particularly. There should also be mentioned, quite generally, all types of heating energies in which economical utilisation can be improved by buffering by means of latent heat accumulators. Thus, storage of electrical current at the cheap night rate is also possible by means of the use according to the invention.

The invention also makes it possible quite generally to protect bodies against overheating or against overcooling. For this, the procedure followed is either that the crystalline, crosslinked synthetic resins, used according to the invention, are embedded as granules or powders in the material to be protected, if appropriate in the parts of the body which are exposed to heat or cold, or that the synthetic resins are applied externally as a "protective packing" to the surfaces which are exposed to heat or cold. In both cases, the crystallite melting point is so chosen that it approximately corresponds to the desired normal temperature of the body which is to be protected. For example, batteries, bearings of crankshafts, household equipment and the like can be protected in the manner described.

Following the same basic principle, bridges, roads, ramps and the like can also be kept free from ice by the use according to the invention.

For the sake of completeness it should be mentioned that the use according to the invention is also feasible for simpler systems, such as, for example, hotplates, heated pillows ("hot-water bottles") and the like. Furthermore, the use according to the invention is also feasible for medical-therapeutic treatments or for temperature control, for example in photographic development technology.

By means of the invention it is also possible to release heat in metered amounts to other bodies, at any desired temperature, whilst keeping the selected temperature constant, and even given unfavourable circumstances in respect of space and size. Such prerequisites and requirements apply, for example, when curing curable synthetic resin mixtures in cable end seals or curing dental fillings or dental adhesives based on synthetic resins. If the bodies which are to take up the heat from the storage material are structures of very complicated shape, it is appropriate to produce a negative mould from the crystalline, crosslinked synthetic resin used according to the invention. This ensures sufficiently intensive contact during the subsequent heat transfer. In many cases (such as, for example, in the case of cable and sealing) it suffices, on the other hand, if the body to be warmed is surrounded by the heat-charged storage material in the form of a powder or granules. Here, as also in use in dental technology, the use of rubbery-elastic bodies, preferably panels, especially of the epoxide resin (L), is also conceivable. Generally, panels of this type are easily deformable in the heated state, so that in this special use according to the invention they adapt in an advantageous manner closely to the body to be heated.

The use according to the invention is not restricted to terrestrial spaces and to the terrestrial atmosphere, but can also be realised in full in extra-terrestrial regions, such as, for example, in space, and in a vacuum.

EXAMPLE 1

(Epoxide resin (J))

(a) Manufacture of the latent heat accumulator in a panel form 1,555 g (1.0 equivalent) of an acid polyester prepared from 11 mols of sebacic acid and 10 mols of hexanediol by the melt process are warmed to 110° C. and mixed well with 167 g (1.0 equivalent) of the following triepoxide compound

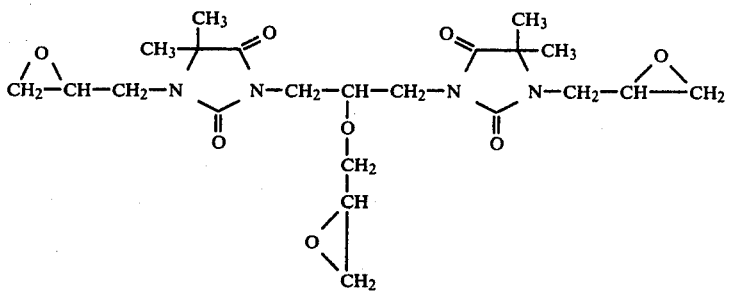

the system is evacuated and the mixture is poured into Anticorodal moulds (internal dimensions 200×200×36 mm), which have been treated with mould-release agents and pre-warmed to 120° C. The mixture was cured for 16 hours at 140° C. A panel which is rubbery-elastic when hot and crystalline after cooling and which has a crystallite melting point of 62° C. was obtained. The enthalpy of melting, measured with a DSC-2 differential calorimeter from Perkin-Elmer, was 20 cal/g.

(b) Test to determine the suitability for storing the enthalpy of melting

The panel obtained according to (a) was covered with a thin sheet of foam and, on top of this, a thin material. It was warmed at 70° C. in a drying cabinet until all the crystals had melted. Subsequently, the curve for the fall in temperature at the surface of the panel was recorded at room temperature by means of a thermocouple and a chart recorder. The valves obtained from the measurements are summarised in Table 1.

TABLE 1

| Time (hours) | Temperature (°C.), panel surface |
|---|---|
| 0 | 70 |
| 1 | 57 |
| 2 | 54 |
| 3 | 50 |
| 4 | 47 |
| 5 | 47 |
| 6 | 48 |
| 7 | 48 |
| 8 | 48 |
| 9 | 47 |
| 10 | 47 |
| 11 | 46 |
| 12 | 45 |

It can be seen from the temperature pattern that, because of the heat of crystallisation which is released, the system remains at 47°–48° C., that is to say the recrystallisation point of the system, for 6 hours and then releases further heat in a delayed manner.

EXAMPLE 2

(Epoxide resin (J))

(a) Manufacture of the latent heat accumulator 1,000 g (0.93 equivalent) of an acid polyester prepared from 11 mols of adipic acid and 10 mols of hexanediol by the melt process are warmed to 110° C. and mixed well with 104 g (0.93 equivalent) of triglycidyl isocyanurate and 11 g of a black dye paste, the system is evacuated and the mixture is poured into Anticorodal moulds (internal dimensions 200×200×24 mm), which have been treated with mould-release agents and pre-warmed to 120° C. The mixture is cured for 16 hours at 140° C. A panel which is rubbery-elastic when hot and crystalline after cooling and which has a crystallite melting point of 44° C. is obtained. The enthalpy of melting, measured with a DSC-2 differential calorimeter from Perkin-Elmer, is 14.4 cal/g.

(b) Use of the panel according to (a) as a heat rectifier

The experiment is carried out using the following model climatic chamber: It consists of a box which is made of a rigid plastic foam and which has, at the top, a square opening with dimensions of 200×200 mm. The wall thickness of the box is 10 mm, the internal height is 120 mm and the internal widths are 240 mm. The latent heat store manufactured according to (a) is let into the square opening. A glass plate is fitted above the panel at a distance of 5 mm. A thermocouple is fitted in the centre of the box.

The following tests on climatic conditioning of the inner space of the box were carried out in Basle on 21.1.1975.

The box was exposed to solar radiation from 11 a.m. The temperature measured by the thermocouple was recorded by means of a chart recorder. A temperature pattern which is illustrated in Table 2 was obtained.

TABLE 2

| Time (hours) | Temperature (°C.) Blank test | Temperature (°C.) Heat rectifier |
| --- | --- | --- |
| 0 | 22 | 22 |
| 1 | 41 | 22 |
| 2 | 43 | 29 |
| 3 | 41 | 33 |
| 4 | 39 | 34 |
| 5 | 12 sun gone in | 30 |
| 6 | 9 | 24 |
| 7 | 9 | 17 |

The table also gives the values for a blank test. In this blank test a box was used which was of exactly the same construction as that employed in the main experiment, the only difference being that the latent heat store was omitted.

The temperature pattern on the simplified model shows the rectifying effect of the heat rectifier pattern.

EXAMPLE 3

(Epoxide resin (K))

108 g (0.1 equivalent) of an acid polyester, prepared from 11 mols of adipic acid and 10 mols of hexanediol and 155 g of an acid polyester prepared from 11 mols of sebacic acid and 10 mols of hexanediol (both prepared by the melt process) was warmed to 100° C. and mixed well with 22 g (0.2 equivalent) of triglycidyl isocyanurate and the mixture is poured into Anticorodal moulds which have internal dimensions of 150×150×1 mm, have been pre-treated with a silicone mould-release agent and have been pre-warmed to 120° C. The mixture is cured for 16 hours at 140° C. Crystalline, tough mouldings with the following properties are obtained:

| | |
| --- | --- |
| Tensile strength according to VSM 77,101 (moulding No. 1)* | = 18 N/mm$^2$ |
| Elongation at break | = 520% |
| Crystallite melting point $Tm_1$** | = 27° C. |
| Crystallite melting point $Tm_2$ | = 50° C. |

*The mouldings are punched from the 1 mm thick panel using a punching tool. The tensile test also corresponds to ISO R 527.
**Determined with a differential scanning calorimeter (heating rate = 10° C./minute).

The panel has two melting points which are ascribed to the two polyesters used. Above the melting points, the moulding is soft and rubbery-elastic. It is suitable as a storage material for latent heat accumulators.

EXAMPLE 4

(Epoxide resin (L))

77 g (0.05 equivalent) of an acid polyester prepared, by the melt process, from 21 mols of succinic anhydride and 20 mols of butanediol and 35 g (0.05 equivalent) of an acid polyester prepared, by the melt process, from 8 mols of adipic acid and 7 mols of neopentylglycol are warmed to 120° C. and mixed well with 11.0 g (0.1 equivalent) of triglycidyl isocyanurate and the mixture is poured into Anticorodal moulds which have internal dimensions of 150×150×1 mm, have been treated with a silicone mould-release agent and have been pre-warmed to 140° C. After removing the air, the mixture is cured in vacuo for 16 hours at 140° C. Crystalline, soft and tough mouldings are obtained, on which the following characteristics are determined:

| | |
| --- | --- |
| Tensile strength according to VSM 77,101 (moulding No. 1)* | = 7.3 N/mm$^2$ |
| Elongation at break according to VSM 77,101 | = 350% |
| Crystallite melting point $(T_m)$** | = 100° C. |

*The mouldings are punched from the 1 mm thick panel using a punching tool. (The tensile test also corresponds to ISO R 527)
**Determined with a differential scanning calorimeter (heating rate = 10°/minute)

The material obtained is suitable as storage material for latent heat accumulators.

EXAMPLE 5

189.2 g (=0.1 equivalent) of an acid polyester obtained from 10 mols dodecanedioic acid and 9 mols of dodecanediol are warmed to 110° C. and mixed well with 16.7 g (=0.1 equivalent) of the heterocyclic triepoxide compound of the formula IV and 1 g of 1-methylimidazole, the system is evacuated and the mixture is poured into a pre-warmed mould with dimensions of 200=200=4 mm. After a heat treatment for 16 hours at 130° C., panels which are soft and rubbery-elastic when hot and white and crystalline after cooling are obtained: crystallite melting point: 81° C., enthalpy of melting 23 cal/g.

Two Anticorodal sheets 25 mm wide are stuck together using a cold-curing epoxide resin based on diphenylolpropane diglycidyl ether (1.0 equivalent) and diethylenetriamine (1.0 equivalent). After coating the surfaces to be stuck, the latter are joined together, placing on top a panel, which has been described above and has been warmed to 100° C., of crystalline epoxide resin. After 1 hour 30 minutes, the resin in the joint coated with adhesive is crosslinked and hard. A comparison test is carried out with a panel, which is warmed to 100°, of a rubbery-elastic epoxide resin which does not crystallise (reaction product obtained from 1 equivalent of sebacic acid-neopentylglycol (11:10) polyester with 1.3 mols of hexahydrophthalic acid diglycidyl ester and 0.3 mol of hexahydrophthalic anhydride). A gelling time of 2 hours 30 minutes results. An analogous experiment with accelerated trimethylhexamethylenediamine as the curing agent gives a curing time of 20 minutes with the crystalline epoxide resin, in contrast to 40 minutes with the amorphous epoxide resin. The release of the heat of crystallisation accordingly effects substantial acceleration of curing.

EXAMPLE 6

159 g of an adipic acid-hexanediol (11:10) polyester, 134 g of a succinic acid-butanediol polyester branched by means of a glycerol molecule and 50.1 g of an epoxide resin of the formula IV (corresponding to a ratio of 1.0:1.0:2.0 equivalents) are warmed to 110° C. and mixed well with 0.9 g of 1-methylimidazole and 1.7 g of Cu phthalocyanine and the system is evacuated. The mixture is poured into pre-warmed moulds which have dimensions of 200×200×7 mm and which contain 3 layers of a 1 mm thick glass fleece. After heat treatment for 16 hours at 130° C. a tough, elastic, blue-coloured laminate which has crystallite melting points of 43° and 54° C. is obtained. When set up in the vicinity of a window inside a room, the laminate is warmed to 48° by solar radiation. The low-melting crystallite is thus melted by the solar radiation and serves as a heat store until the solar radiation decreases, whilst the higher melting crystal assists in maintaining the mechanical strength. Laminates of this type are therefore of particular interest as Venetian blinds inside rooms or as ceiling panels, for example as heat rectifiers for greenhouses.

EXAMPLE 7

1.0 equivalent of a polyester of 10 mols of sebacic acid and 11 mols of hexane-1,6-diol and 1.2 mols of toluylene 2,4-diisocyanate are reacted hot (70° C.), with the exclusion of moisture and in a nitrogen atmosphere. The adduct has an isocyanate equivalent weight of 862 (theory 868). 86.2 g (0.1 equivalent) of the resulting adduct are warmed to 80° and mixed with 4.46 g (0.1 equivalent) or hexanetriol, the system is evacuated and the mixture is poured into a casting mould which has dimensions of 150×150×1 or 150×150×4 mm. After curing for 2 hours at 70°, for 2 hours at 120° and for 2 hours at 140°, a panel which is rubbery-elastic when hot is obtained; at room temperature this changes into the partially crystalline state, with release of the heat of crystallisation. The following characteristics are measured:

| Crystallite melting points | = 51° C. |
| Enthalpy of melting | = 16 cal/g |
| Tensile strength (ISO) | = 24 N/mm² |
| Elongation at break | = 235% |

The advantageous mechanical properties and the thermal properties make it possible to use this panel as energy stores, such as, for example, heated pillows or heat rectifiers.

EXAMPLE 8

1.0 equivalent of the polyester having hydroxyl terminal groups (OH equivalent weight =1,006), which is described in Example 7, is reacted at 150° with 1 mol of maleic anhydride, a polyester with terminal carboxyl groups resulting (equivalent weight 32 1,070). 70 g of the resulting polyester are mixed, at 70° C., with 30 g of styrene and 2 g of 50% strength benzoyl peroxide and, after evacuating the system, the mixture is poured into a tube 3.5 cm in diameter. After curing for 2 hours at 70°, for 2 hours at 120° and for 2 hours at 140°, a moulding which is rubbery-elastic when hot and which changes into the crystalline state on cooling is obtained.

| Crystallite melting point | = 33° C. |
| Enthalpy of melting | = 8 cal/g |

Mouldings of this type can also be employed for storing energy.

We claim:

1. An improved process of absorbing and releasing thermal energy in a latent heat accumulator using a latent heat storage material, wherein the improvement comprises employing as the latent heat storage material a crystalline crosslinked synthetic resin selected from the group consisting of epoxide resins, polyurethane resins, polyester resins and mixtures thereof which contain, as crystallite-forming blocks, radicals of long-chain dicarboxylic acids or dialcohols of the formula I $$X^1-A-X^2 \qquad (I)$$

in which $X^1$ and $X^2$ each represent a —CO—O— group or a —O— group in which A denotes a substantially linear radical, in which polymethylene chains alternate regularly with ether oxygen atoms or carboxylic acid ester groups, and the quotient Z/Q, wherein Z is the number of $CH_2$ groups present in the recurring structural element of the radical A and Q is the number of oxygen bridges present in the recurring structural element of the radical A, must be at least 3 and wherein the total number of carbon atoms present in the radical A in alternating carbon chains is at least 30, and wherein the crosslinked crystalline synthetic resin has at least one crystallite melting point.

2. A process to claim 1, characterised in that crystalline, crosslinked synthetic resins which have only one crystallite melting point are used.

3. A process to claim 1, characterised in that crystalline, crosslinked synthetic resins which contain several, different types of crystallite having, accordingly, several crystallite melting points are used.

4. A process to claim 1, characterised in that epoxide resins are used.

5. A process according to claim 1, characterised in that crystalline, crosslinked epoxide resins which are obtained by reacting polyester-dicarboxylic acids with polyepoxide compounds having at least 3 epoxide groups, about 1 equivalent of polycarboxylic acid being present per equivalent of epoxide compound, are used.

6. A process according to claim 1, characterised in that crystalline, crosslinked epoxide resins which are obtained by reacting polyester-polycarboxylic acids having at least 3 carboxyl groups with epoxide compounds having at least 2 epoxide groups, about 1 equivalent of polyester-carboxylic acid being present per equivalent of epoxide compound, are used.

7. A process according to claim 1, characterised in that crystalline, crosslinked epoxide resins which are obtained by reacting diepoxide compounds with polyester-dicarboxylic acids and with dicarboxylic acid anhydrides in an equivalent ratio of 1:0.4 to 0.9:1 to 0.6 are used.

8. A process according to claim 1, characterised in that crystalline, crosslinked epoxide resins which are obtained by reacting polyester-polycarboxylic acids with epoxide compounds of the group comprising triglycidyl isocyanurate and triglycidyl compounds which contain one or more hydantoin groups or dihydrouracil groups, are used.

9. A process according to claim 8 wherein the crystalline, crosslinked epoxide resin is obtained by reacting a polyester-polycarboxylic acid with the compound of formula IV

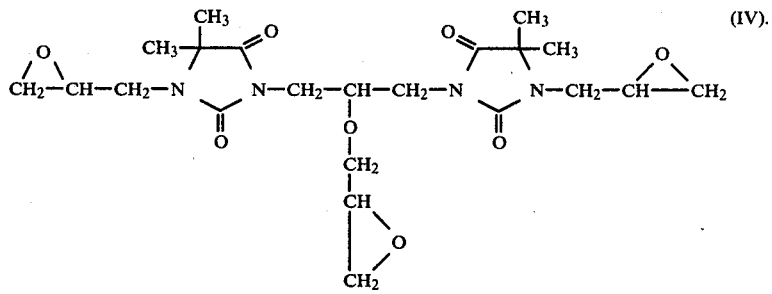

(IV).

10. A process according to claim 1, characterised in that crystalline, crosslinked epoxide resins (J), which are manufactured by reaction of epoxide compounds, containing two or more epoxide groups,
 (a) with polyester-polycarboxylic acids D, which essentially contain segments of the formula II

$$-[O-(CH_2)_n-O.CO-(CH_2)_m-CO]_p-\qquad (II)$$

in which n and m are identical or different and denote 2 or a higher number than 2, and to which the condition $n+m=6$ to 30 applies, and in which p denotes a number from 2 to 40, which, however, is sufficiently large that the segment contains at least 30—$CH_2$—groups, and
 (b) with curing agents C, in a ratio such that 0.5 to 1.2 equivalents of polyester-polycarboxylic acid are present per equivalent of epoxide compound and zero to 0.6 equivalent of curing agent C are present per equivalent of epoxide compound, with the proviso that, in the cases in which only difunctional epoxide compounds and difunctional polyester-polycarboxylic acids D are employed, the epoxide groups must be present in excess and the reaction with a curing agent C is essential, are used.

11. A process according to claim 1, characterised in that crystalline, crosslinked epoxide resins (K), which are manufactured by reaction of epoxide compounds, containing two or more epoxide groups.
 (a) with polyester-polycarboxylic acids D which essentially contain segments of the formula II

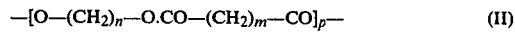
$$-[O-(CH_2)_n-O.CO-(CH_2)_m-CO]_p-\qquad (II)$$

in which n and m are identical or different and denote 2 or a higher number than 2, and to which the condition $n+m=6$ to 30 applies, and in which p denotes a number from 2 to 40, which, however, is sufficiently large that the segment contains at least 30—$CH_2$—groups, and
 (b) with polyester-polycarboxylic acids E which essentially contain segments of the formula III

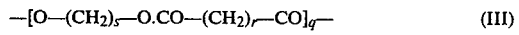
$$-[O-(CH_2)_s-O.CO-(CH_2)_r-CO]_q-\qquad (III)$$

in which s and r are identical or different and denote 2 or a higher number than 2, and to which the condition $s+r+2 \leq n+m$ applies, and in which q represents a number from 2 to 40, which, however, is sufficiently large that the segment contains at least 30—$CH_2$—groups, and
 (c) with curing agents C, in a ratio such that 0.5 to 1.2 equivalents of polyester-polycarboxylic acid are present per equivalent of epoxide compound, that 1/10 to 9/10 of these 0.5 to 1.2 equivalents are attributable to the polyester-polycarboxylic acid D and the remaining 9/10 to 1/10 to the polyester-polycarboxylic acid E, and that zero to 0.6 equivalent of curing agent C is present per equivalent of epoxide compound, with the proviso that, in the cases in which only difunctional epoxide compounds and difunctional polyester-polycarboxylic acids D and E are employed, the epoxide groups must be present in excess and the reaction with a curing agent C is essential are used.

12. A process according to claim 1, characterised in that crystalline, crosslinked, elastomeric epoxide resins (L), which are manufactured by reaction of epoxide compounds, containing two or more epoxide groups,
 (a) with polyester-polycarboxylic acids A which essentially contain segments of the formula V

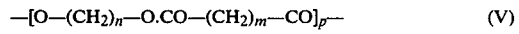
$$-[O-(CH_2)_n-O.CO-(CH_2)_m-CO]_p-\qquad (V)$$

in which n and m are identical or different and denote 2 or a higher number than 2, and to which the condition $n+m=6$ to 30 applies, and in which p denotes a number from 2 to 40 which, however, is sufficiently large that the segment contains at least 30 —$CH_2$—groups, and
 (b) with polyester-polycarboxylic acids B which essentially contain segments of the formula VI

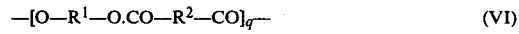
$$-[O-R^1-O.CO-R^2-CO]_q-\qquad (VI)$$

in which $R^1$ and $R^2$ are identical or different and denote an alkylene radical with at least 2 C atoms in the chain and in which, per O bridge, an average of at least 3.5 and at most 30 C atoms, without taking into account the C atoms of the 'CO.O—radicals, are present in the chain, and wherein the radicals $R^1$ or $R^2$ contain at least one alkyl group, or cycloalkyl group or one aryl group as a substituent for one H atom or one ring-forming optionally substituted alkylene group as a substituent for two H atoms of a chain, and in which q denotes a number from 2 to 40, which, however, is sufficiently large that the segment contains at least 30 C atoms, without taking into account the C atoms of the —CO.O—radicals in the chain, and (c) with curing agents C, in a ratio such that 0.5 to 1.2 equivalents of polyester-polycarboxylic acid are present per equivalent of epoxide compound, that 5/10 to 9/10 of these 0.5 to 1.2 equivalents are attributable to the polyester-polycarboxylic acid A and the remaining 5/10 to 1/10 to the polyester-polycarboxylic acid B, and that zero to 0.6 equivalent of curing agent C is present per equivalent of epoxide compound, with the proviso that, in the cases in which only difunctional epoxide compounds and difunctional polyester-polycarboxylic acids A and B are employed, the epoxide groups must be present in excess and the reaction with a curing agent C is essential, are used.

13. A process according to claim 1, characterised in that the crystalline, crosslinked synthetic resins are used in latent heat accumulators which serve for the storage and re-release of solar energy.

14. A process according to claim 1, characterised in that the crystalline, crosslinked synthetic resins are used in latent heat accumulators which serve for the storage and re-release of types of energy other than solar energy.

15. A process according to claim 1, characterised in that the crystalline, crosslinked synthetic resins are used in the form of foams.

16. A process according to claim 1, characterised in that the crystalline, crosslinked synthetic resins are used in the form of laminates.

17. A process according to claim 1, characterised in that the crystalline, crosslinked synthetic resins are used in the form of a powder or a granules, which are filled into a container.

18. A process according to claim 1, characterised in that those crystalline, crosslinked synthetic resins which, after absorption of the heat of melting of the crystallites, are readily deformable and rubbery-elastic and are employed in the form of panels or mouldings.

19. A process according to claim 1, characterised in that the crystalline, crosslinked synthetic resins are used in heat rectifiers, for controlling the absorption of solar energy in areas which are to be climatically controlled.

20. A process according to claim 1, characterised in that the crystalline, crosslinked synthetic resins are used in latent heat accumulators which serve to supply heat during the hot curing of curable synthetic resin mixtures in dental technology.

21. A process according to claim 1, characterised in that those crystalline, crosslinked synthetic resins which contain nucleating agents, selected from phthalocyanines or α-naphthoic acid, are employed.

22. A process according to claim 1, characterised in that those crystalline, crosslinked synthetic resins which contain fillers which assist the heat conductivity selected from aluminium, carbon black and graphite, are employed.

23. A process according to claim 1, characterised in that those crystalline, crosslinked synthetic resins which contain flame-proofing fillers selected from aluminium oxide trihydrate, antimony trioxide and chlorinated paraffins are employed.

* * * * *

UNITED STATES PATENT AND TRADEMARK OFFICE
CERTIFICATE OF CORRECTION

PATENT NO. : 4,259,198
DATED : MARCH 31, 1981
INVENTOR(S) : URSULA KREIBICH AND ROLF SCHMID

It is certified that error appears in the above-identified patent and that said Letters Patent are hereby corrected as shown below:

Claim 2, Column 16, Line 1 reads:
"A process to claim 1, characterised in that crystal-"

Should read:
"A process according to claim 1, characterised in that crystal-"

Claim 3, Column 16, Line 1 reads:
"A process to claim 1, characterised in that crystal-"

Should read:
"A process according to claim 1, characterised in that crystal-"

Claim 4, Column 16, Line 1 reads:
"A process to claim 1, characterised in that epoxide"

Should read:
"A process according to claim 1, characterised in that epoxide"

Signed and Sealed this

Tenth Day of November 1981

[SEAL]

Attest:

Attesting Officer

GERALD J. MOSSINGHOFF
Commissioner of Patents and Trademarks